United States Patent
Jane et al.

(10) Patent No.: US 9,329,663 B2
(45) Date of Patent: May 3, 2016

(54) PROCESSOR POWER AND PERFORMANCE MANAGER

(71) Applicant: Apple Inc., Cupertino, CA (US)

(72) Inventors: Jason Jane, San Jose, CA (US); Gokhan Avkarogullari, San Jose, CA (US); Eric Sunalp, San Jose, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 14/021,945

(22) Filed: Sep. 9, 2013

(65) Prior Publication Data

US 2015/0074435 A1   Mar. 12, 2015

(51) Int. Cl.
*G06F 1/32* (2006.01)

(52) U.S. Cl.
CPC .............. *G06F 1/324* (2013.01); *G06F 1/3206* (2013.01)

(58) Field of Classification Search
CPC ................................ G06F 1/324; G06F 1/3206
See application file for complete search history.

(56) References Cited

U.S. PATENT DOCUMENTS

| | | | |
|---|---|---|---|
| 7,194,385 B2 | 3/2007 | Flautner | |
| 7,970,566 B2* | 6/2011 | Moore | G06F 17/18 702/79 |
| 8,046,605 B2 | 10/2011 | Krauthgamer | |
| 8,452,999 B2 | 5/2013 | Barth | |
| 2010/0057404 A1* | 3/2010 | Dittmann | G06F 1/3203 702/186 |
| 2013/0173948 A1 | 7/2013 | Magklis | |
| 2013/0305075 A1* | 11/2013 | Vasan | G06F 11/3062 713/340 |

* cited by examiner

*Primary Examiner* — Stefan Stoynov
(74) *Attorney, Agent, or Firm* — Blank Rome LLP

(57) ABSTRACT

Techniques are provided for managing the power consumption and performance of a processing device. Power consumption and utilization ratios for a processing device may be continuously measured. The measured power consumption and utilization ratios may be compared to target power consumption and utilization ratios to adjust an operating frequency of the processing device. In one implementation a power controller may take the target and measured power consumption as inputs to generate a power output and a utilization controller may take the target and measured utilization ratios as inputs to generate a utilization output. The lower of the power output and the utilization output may be selected and used to adjust the operating frequency of the processing device. The power and utilization controllers may implement a proportional-integral control scheme.

18 Claims, 5 Drawing Sheets

UTILIZATION CONTROLLER (330)

POWER CONTROLLER (325)

UTILIZATION CONTROLLER (330)

POWER CONTROLLER (325)

MIN SELECT CONTROLLER (335)

RATE LIMITER (340)

PROCESSOR POWER AND PERFORMANCE MANAGER

BACKGROUND

This disclosure relates generally to the management of power consumption and performance of integrated circuits and systems employing such integrated circuits.

As integrated circuits become more compact and the number of electrical components within integrated circuits increases, managing the power consumed by an integrated circuit becomes a critical operation. Power management is especially important for devices such as mobile telephones, personal music players, laptops, and tablet computer systems that rely on battery power. By managing the power consumed by the integrated circuits in these devices, thermal issues and battery life can be extended.

Frequency scaling, a method in which the operating frequency of a processor is dynamically adjusted, is a known method for managing the power consumed by a processor. While a decrease in the operating frequency of a processor reduces power consumption, it also results in a corresponding decrease in the number of instructions that can be executed by the processor in a given time period, reducing the user's perceived performance. It is therefore desirable to evaluate the operating parameters of a processor in order to determine an optimal operating frequency that balances power management and processor performance.

SUMMARY

In one embodiment the inventive concept provides a method to manage the power consumption and performance of a processing device that includes comparing the device's measured and target power consumption to determine a power consumption difference. Comparing the device's measured and target utilization ratios to determine a utilization ratio difference. Determining a first output that would reduce the power consumption difference and a second output that would reduce the utilization ratio difference. Selecting an output frequency for the device based, at least in part, on a combination of the first and second outputs and adjusting the device's operating frequency based, at least in part, on the selected output frequency. A computer executable program to implement methods in accordance with this disclosure may be stored in any media that is readable and executable by a processing device.

DETAILED DESCRIPTION

This disclosure pertains to systems, methods, and computer readable media for optimizing an operating frequency of a processing device. In general, power and utilization parameters of a processing device are measured and are utilized in a feedback control loop to determine an operating frequency for the processor. While this disclosure describes the implementation of the power and performance management method in the context of a graphical processing unit (GPU), the disclosed techniques are equally applicable to other types of processing devices including central processing units (CPUs).

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of processing device design having the benefit of this disclosure.

Figure 1:
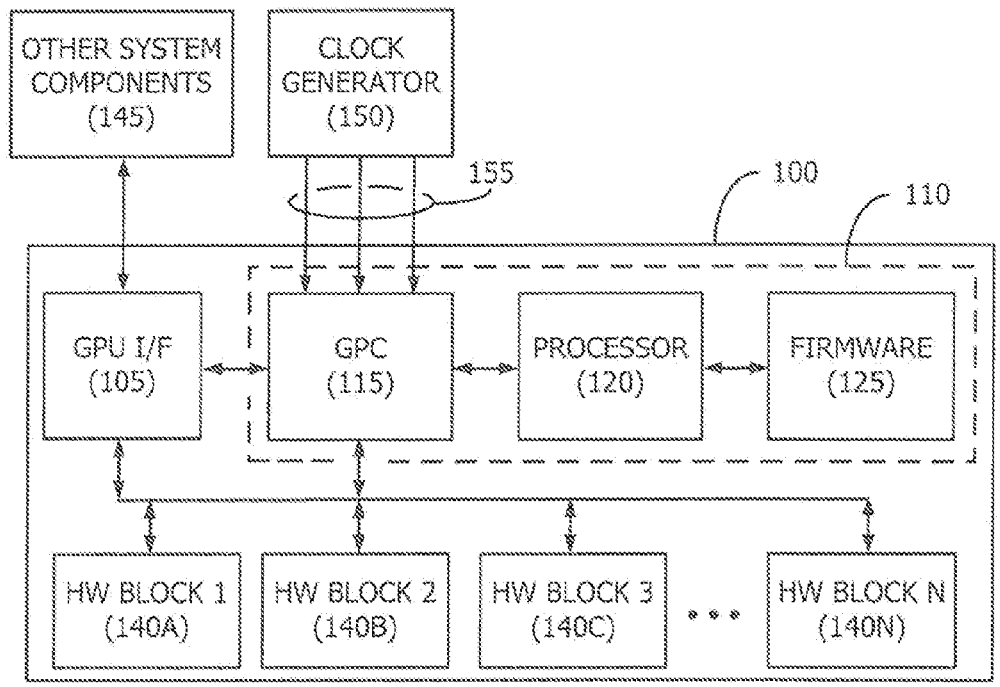
FIG. 1 is a block diagram that illustrates the components of a processing device in accordance with one embodiment.

Referring to FIG. 1, GPU 100 includes GPU interface 105, GPU frequency controller 110, and multiple GPU hardware blocks 140A-N. GPU 100 may be a standalone processor or may be one of multiple processors that are implemented as a single integrated circuit such as a system on a chip (SOC). In one embodiment, GPU 100 may be implemented as part of an integrated circuits such as that disclosed in co-pending application Ser. No. 13/466,597, filed on May 8, 2012 and entitled "Graphics Hardware and Mode Controls," which is incorporated herein by reference in its entirety.

GPU interface 105 may be configured to receive transactions from other system components 145 for GPU 100. Transactions may include commands from a central processing unit (CPU), such as a kick command indicating that there are one or more new tasks for the GPU 100 to perform. The transactions may also include responses to read requests transmitted by GPU 100, such as read requests to read task descriptors from memory or to retrieve data that is to be operated upon by GPU 100. The read requests, as well as write requests for results generated by GPU 100, may be transmitted to a memory by GPU interface 105. In one embodiment, GPU interface 105 may include a transaction queue to store received transactions.

GPU frequency controller 110 includes graphics power controller 115, processor 120, and firmware 125. GPU frequency controller 110 can be a combination of hardware and firmware that implements all or some of the frequency control functionality described below. Firmware 125 may include program code to cause processor 120 to evaluate power and performance parameters of GPU 100 and to determine an optimal operating frequency as a function of the parameters. Firmware 125 may include any type of storage medium, including the storage media described below with respect to FIG. 6.

In one embodiment, processor 120 may be a microcontroller that is embedded in GPU 100. For example, processor 120 may be a microcontroller with dedicated interfaces to firmware 125 and graphics power controller 115. In such an embodiment, processor 120 may serve the dedicated function of executing the frequency controller code in firmware 125. Although FIG. 1 illustrates processor 120 as a dedicated processor for the execution of the frequency controller functionality, in another embodiment, one or more GPU hardware blocks (e.g., one of hardware blocks 140A-N) may execute the frequency controller program code that is stored in firmware 125. As will be described in greater detail below, the frequency controller program code in firmware 125 may require input values that represent current operating parameters of GPU 100 as well as target operating parameters. In one embodiment, these operating parameters may be obtained by processor 120 from graphics power controller 115. Graphics power controller 115 may obtain the operating parameters from GPU interface 105 and may receive an output from processor 120 that specifies an operating mode for GPU 100. In another embodiment, these operating parameters may be obtained from another system element via GPU interface 105 (e.g., a host computer system's CPU). Based on the received output, graphics power controller 115 may select an operational frequency from one of multiple predefined operating frequencies 155 (e.g., received from clock generator 150. Hardware blocks 140A-N may include unified shaders (e.g., vertex, geometry and pixel), pixel shaders, vertex shaders, texture processing units, rasterizers, etc. Hardware blocks 140A-N may also execute compute programs (e.g., compute kernels). The tasks that are to be performed by GPU 100 may employ various ones of hardware blocks 140A-N operating at the operational frequency selected by graphics power controller 115.

Figure 2:
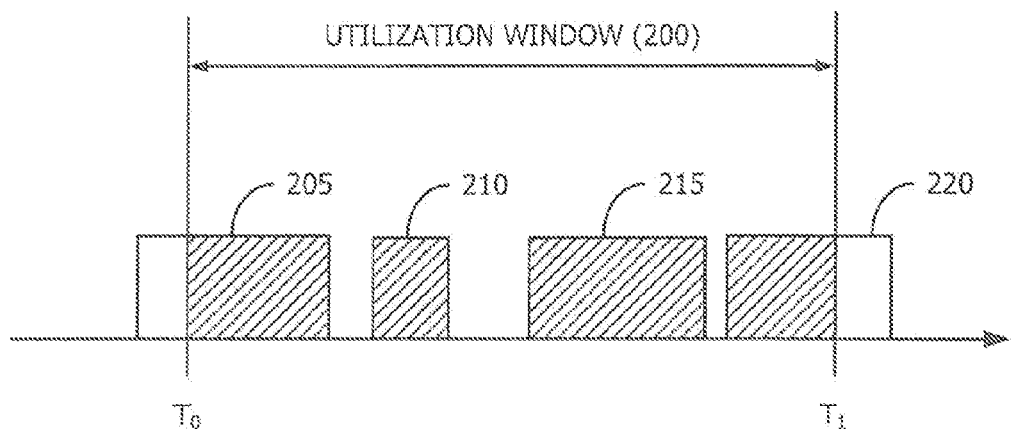
FIG. 2 is a diagram that illustrates the determination of a processing device utilization ratio during a utilization window in accordance with one embodiment.

Referring to FIG. 2, the start and stop times of the tasks performed by GPU 100 may be recorded. In the illustrated embodiment, tasks 205, 210, 215, and 220 are performed at least partially within utilization window 200. In one embodiment, the start and stop times may be recorded by firmware 125. Utilization window 200 can be a selected period during which a utilization ratio is determined. In one embodiment, utilization window 200 may correspond to a screen refresh rate for a display that is driven by GPU 100. The time periods for the portions of the tasks that occur within utilization window 200 (e.g., the shaded portions in FIG. 2) are summed to obtain an active time value during utilization window 200. The active time value is then divided by the duration of utilization window. For example, an active time value of 15.20 milliseconds in a utilization window having a duration of 16 milliseconds would result in a utilization ratio of 95%. For a given number of tasks, a higher operating frequency would result in a lower utilization ratio than would a lower operating frequency. That is, the tasks would be completed in less time at the higher operating frequency. In one embodiment, the utilization ratio may be continuously updated. For example, time T1 may correspond to the end of utilization window 200 and the beginning of a subsequent utilization window.

Figure 3:
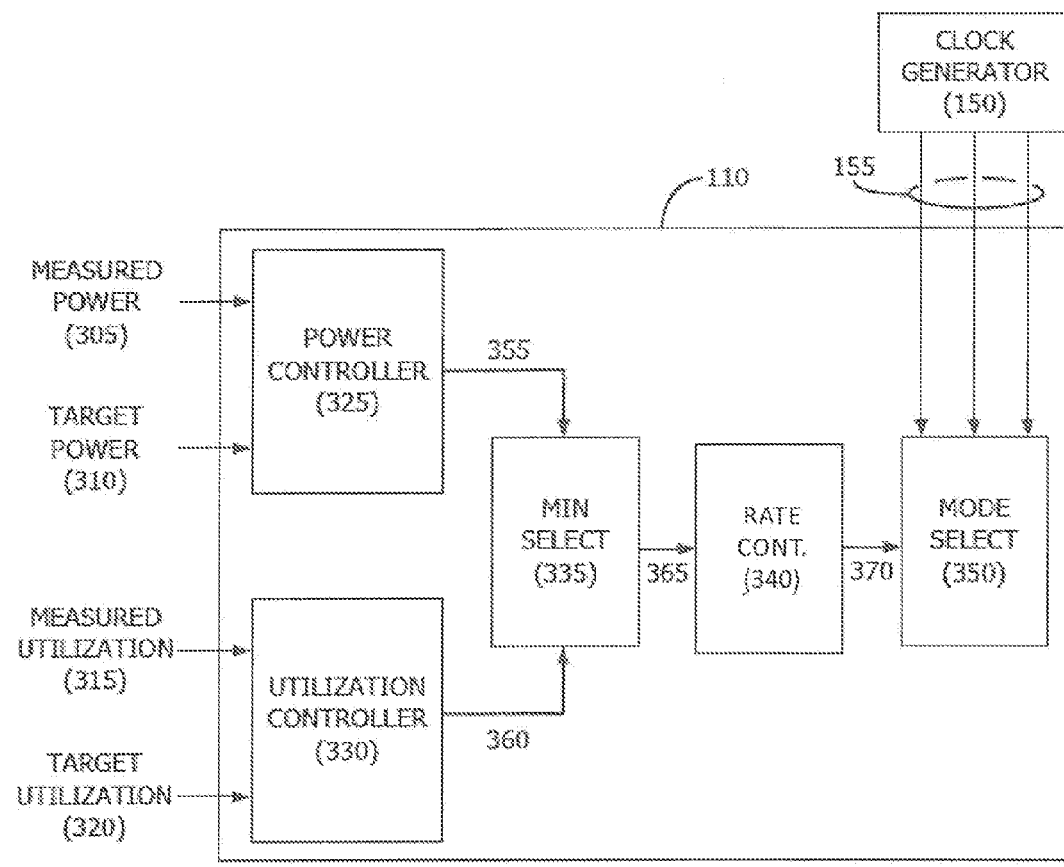
FIG. 3 is a block diagram that illustrates various components of a power and performance controller portion of the processing device of FIG. 1 in accordance with one embodiment.

Referring to FIG. 3, the functionality of frequency controller 110 is illustrated in block diagram form in accordance with one embodiment. The measured (305) and target (310) power consumption of GPU 100 may be provided as inputs to power controller 325. The power consumption of GPU 100 may be measured by a power measurement unit of GPU 100 as described in co-pending application Ser. No. 13/466,597 and may represent an instantaneous power consumption or an average power consumption over a measurement period. The power consumption of GPU 100 may also be an estimated power stored in software. Target power consumption 310 may be determined in a variety of manners. In one embodiment, target power consumption 310 may be a static target value. In another embodiment, target power consumption 310 may be dynamically adjusted based on other measured values. For example, target power consumption 310 may be adjusted based on measured system temperature (e.g., the measured temperature of GPU 100 or an integrated circuit that includes GPU 100), remaining battery life, etc. The measured and target power consumption of GPU 100 may be updated at the same or different rates.

The measured (315) and target (320) utilization ratios of GPU 100 may be provided to utilization controller 330 that is separate from power controller 325. As described above, in one embodiment, utilization ratio 315 may be measured in consecutive utilization windows that correspond to the screen refresh rate of a display that is driven by GPU 100. In such an embodiment, the update rate for measured utilization ratio 315 may correspond to the screen update rate. In another embodiment, the update rate for measured utilization ratio 315 may differ from the screen refresh rate. The update rates for the measured and/or target power consumption may or may not correspond to the update rate for the measured utilization ratio. In one embodiment, target utilization ratio 320 may be a static value. In such an embodiment, the static value may be specific to particular hardware. For example, different target utilization rates may be appropriate for different classes of processors.

Although power controller 325 and utilization controller 330 each attempt to drive the operating frequency of GPU 100, they serve different functions. Power controller 325 attempts to identify the operating frequency that matches the power consumption of GPU 100 with a given power budget (e.g., target power consumption 310). Therefore, if the target power consumption is high (e.g., the device is operating at low temperatures or has a substantial remaining battery life), the power controller may allow it to operate at the highest operating frequency allowable by the power budget. However, the operating frequency determined by the power controller may not be necessary to perform the GPU's tasks. For example, if GPU 100 is not heavily loaded (e.g., is not performing a large amount of processing intensive operations), operating at the high operating frequency dictated by target power consumption 310 may result in a low utilization ratio. This is wasteful as the required amount of work to be performed by GPU 100 may be performed at a lower power consumption rate without any decrease in performance by operating at a lower frequency. Therefore, utilization controller 330 serves as a check on power controller 325 and results in a lower operating frequency where the work to be performed by GPU 100 does not necessitate the higher operating frequency that is allowable under a current target power consumption value.

In one embodiment, power controller 325 and utilization controller 330 may be proportional-integral (PI) controllers. As is known by those of ordinary skill in the art, a PI controller adjusts an output based on separate contributions of a proportional term and an integral term. The proportional term is determined as a function of a proportional tuning parameter and the error between the measured and target input values. The integral term may be determined as a function of an integral tuning parameter and the integral of the error between the measured and target input values over a preceding time period. Acting together, these two terms can adjust an output value in an attempt to eliminate the error between the measured and target input values. Both power controller 325 and utilization controller 330 adjust the operating frequency of GPU 100. It should be noted, however, that power controller 325 and utilization controller 330 have opposite control actions. In response to an increasing error between measured and target power consumption (e.g., target power consumption minus measured power consumption), power controller 325 increases output 355 to increase the operating frequency (e.g., to increase the power consumption towards the target). By contrast, in response to an increasing error between measured and target utilization (e.g., target utilization ratio minus measured utilization ratio), utilization controller 330 decreases output 360 to decrease the operating frequency (e.g., to increase the utilization ratio towards the target). In one embodiment, power controller 325 and utilization controller 330 may be separately/independently tuned (e.g., the tuning parameters may be determined separately) such that either controller is capable of independently controlling the operating frequency of GPU 100 to minimize the error between the controller's measured and target inputs. While power controller 325 and utilization controller 330 have been described as PI controllers, in other embodiments, other types of controllers such as proportional-integral-derivative (PID) controllers may be implemented.

In one embodiment, output 355 and output 360 may be passed to minimum select controller 335. Minimum select controller 335 may then select the lower of output 355 and output 360. That is, the controller output that represents a lower operating frequency (and therefore a lower power level) is the selected output. In another embodiment, minimum select controller 335 may be replaced with a "maximum" or "combine" operator. That is, controller 335 may select the higher operating frequency or a combination of the lower and higher operating frequency (e.g., the average)—depending upon the designer's ultimate goal. In the illustrated embodiment, output 365 that is selected by minimum select controller 335 may be passed to rate controller 340. In general, output 365 may be thought of as a scaling value that maps to various available operating frequencies of the GPU. Rate controller 340 may act as a filter that dampens or modulates changes in selected output 365. In one embodiment, rate controller 340 may only dampen changes in output 365 in a particular direction (e.g., the filter may only apply to either increasing or decreasing rates) so as to gradually effect operational frequency changes. For example, it may be desirable to increase the operational frequency quickly but to decrease the operational frequency more gradually. In such an embodiment, rate controller 340 may pass through output 365 if it is higher than an immediately preceding output but may filter output 365 if it is lower than an immediately preceding output such that the decrease in operational frequency is effected over multiple control cycles. Although rate controller is illustrated as operating on selected output 365, in another embodiment, independent rate controllers may be placed at the output of power controller 325 and utilization controller 330 (and before minimum select operator 335). In this way the rate controlling functionality may be implemented differently for each controller.

Output 370 from rate controller 340 may be passed to mode select controller 350. Mode select controller 350 may translate output 370 to one or more operating frequencies. In one embodiment, the outputs of power controller 325 and utilization controller 330 are equal to the number of predetermined active operating frequencies (e.g., excluding an idle state of GPU 100) multiplied by 100%. In such an embodiment, the output may be translated by mode select controller 350 to determine a portion of time in a certain control period to operate at various predetermined operating frequencies. It may be recognized by those of ordinary skill in the art that, in this particular configuration, mode select controller 350 may be said to control or modulate the "duty cycle" of GPU 100 by limiting the amount of time GPU 100 may be on during the control period. By way of example, an output of 140% could be translated to an operating mode in which GPU 100 operates at the low frequency (e.g., 350 MHz) for 60% of a control period and at the middle frequency (e.g., 400 MHz) for 40% of the control period. In accordance with this scheme, an output of less than 100% can result in an operating mode that includes an idle state for some portion of the control period. The control period may be a selected duration during which an output is applied and may or may not correspond to the update rates of the inputs to the power and utilization controllers. Based on a received output value, mode select controller 350, which may be implemented as part of graphics power controller 115, may select the appropriate operating frequencies from clock generator 150 during the control period.

Figure 4A:
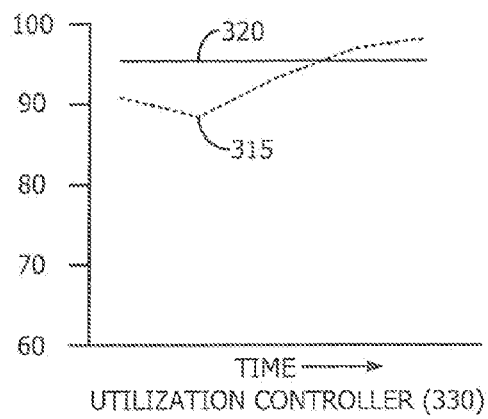
FIGS. 4A-4F illustrate the response of a processor power and performance controller at various operating parameters in accordance with one embodiment.
Figure 4B:
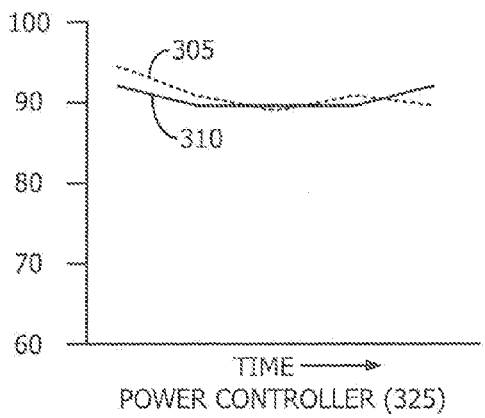

Referring to FIGS. 4A-4E, controller inputs and outputs over an example time period are illustrated. In FIG. 4A, target utilization ratio 320 and measured utilization ratio 315 (inputs to utilization controller 330) are plotted as a percentage of active time during each of multiple consecutive utilization windows over a certain time period. In the illustrated embodiment, target utilization ratio 320 is static over the measured time period. In FIG. 4B, target power consumption 310 and measured power consumption 305 (inputs to power controller 325) are plotted as a percentage of maximum power consumption over the same time period illustrated in FIG. 4A. As shown in FIG. 4B, target power consumption 310 is dynamic over the measured time period. As noted above, target power consumption 310 may be adjusted based on temperature measurements, remaining battery life, etc.

Figure 4C:
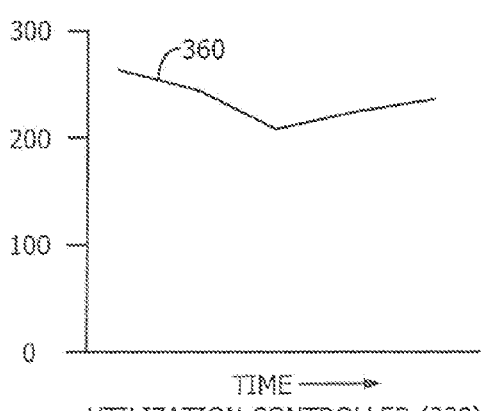
Figure 4D:
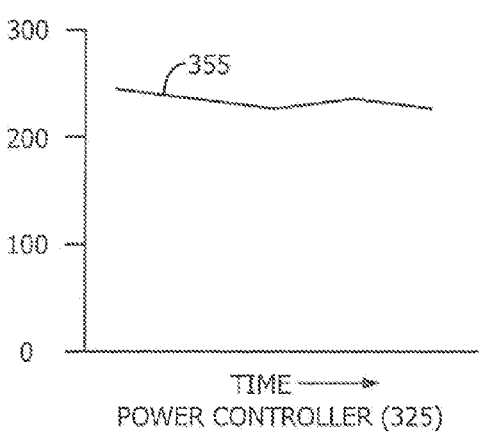

Referring to FIGS. 4C and 4D, outputs 360 and 355 of utilization controller 330 and power controller 325, respectively, are illustrated over the same time period as that shown in FIGS. 4A and 4B. As illustrated in FIG. 4C, utilization controller 330 decreases output 360 to increase utilization ratio 315 and increases output 360 to decrease utilization ratio 315 to reduce error between the target and measured utilization ratios. As illustrated in FIG. 4D, power controller 325 increases output 355 to increase power consumption 305 and decreases output 355 to decrease power consumption 305 to reduce error between the target and measured power consumption. The outputs variable shown in FIGS. 4D and 4E have a range of 0 to 300 indicating there are three active predefined frequencies that can be selected as described above.

Figure 4E:
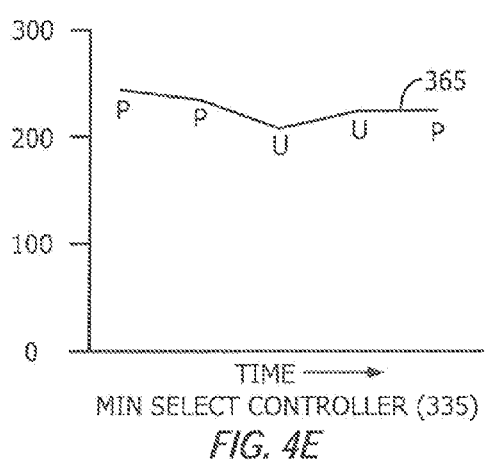
Figure 4F:
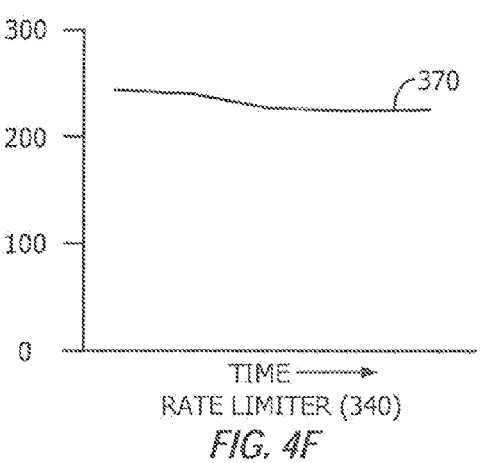

Referring to FIG. 4E, output 365 of minimum select controller 335 is plotted. As illustrated, when output 355 of power controller 325 is less than output 360 of utilization controller 330, output 355 is selected as output 365 by minimum select controller 335 and vice versa. Referring to FIG. 4F, output 370 of rate controller 340 is plotted. In the illustrated embodiment, rate controller filters decreases in output 365 such that decreases are effected over multiple control periods. However, increases in output 365 are not filtered and are therefore effected immediately.

Figure 5:
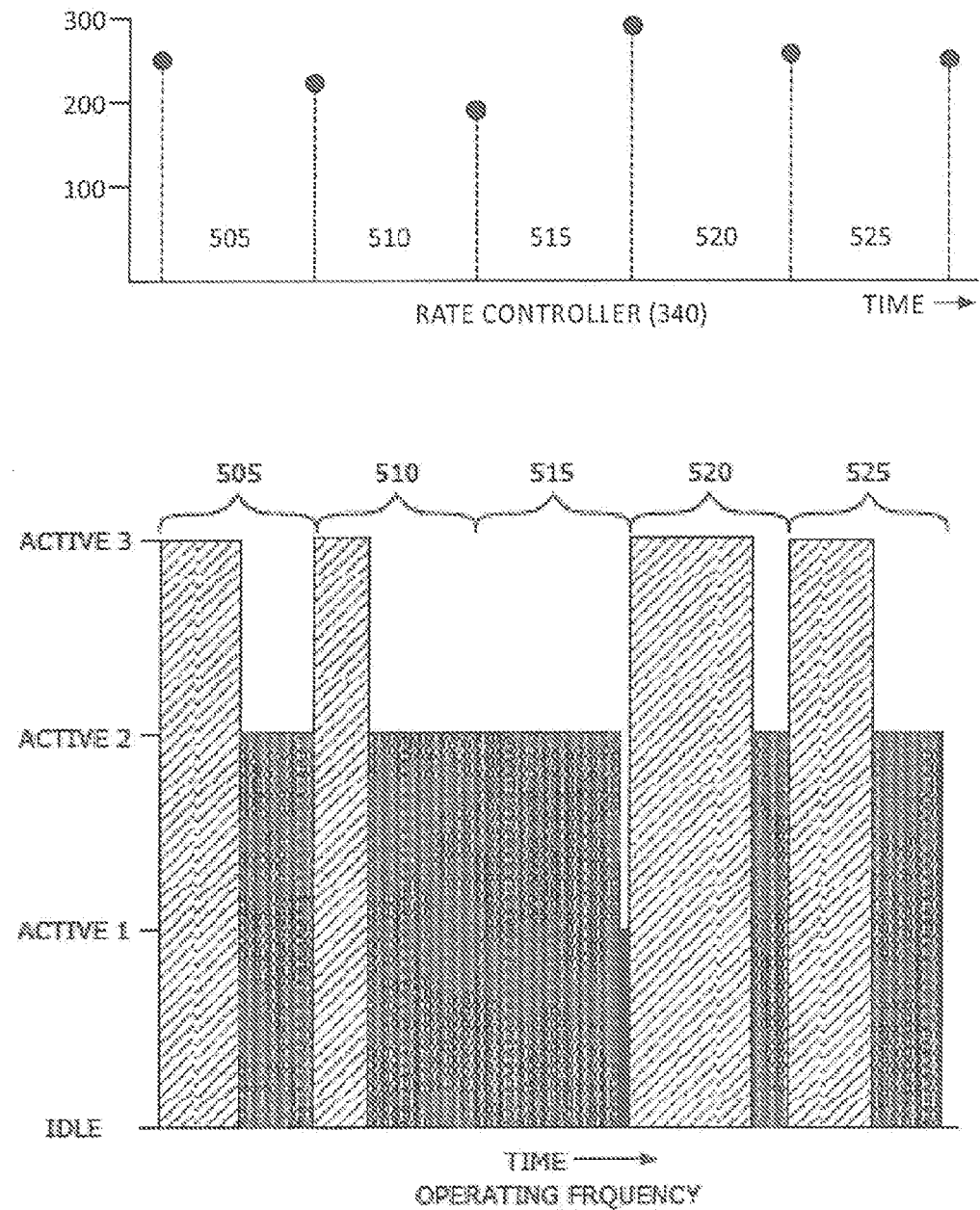
FIG. 5 illustrates the adjustment of the operating frequency of a processing device during different control periods based on an output of a processor power and performance controller in accordance with one embodiment.

FIG. 5 illustrates the operating frequencies selected by mode select controller 350 as a result of output 370 from rate controller 340. In the illustrated embodiment, mode select controller 350 selects between three predefined active states and an idle state (Active 1, Active 2, and Active 3 from lowest frequency to highest frequency). As illustrated, mode select controller 340 varies the portion of time that a processor operates at various predefined frequencies within a control period. For example, based on the value of output 370 at the beginning of control period 505, mode select controller 340 selects the Active 3 frequency for approximately 50% of control period 505 and the Active 2 frequency for the remainder of control period 505. Based on the decreased value of output 370 at the beginning of control period 510, mode select controller 350 selects the Active 3 frequency for approximately 25% of control period 510 and the Active 2 frequency for the remainder of control period 510. Likewise, based on the further decreased value of output 370 at the beginning of control period 515, mode select controller 350 selects the Active 2 frequency for approximately 95% of control period 515 and the Active 1 frequency for the remainder of control period 515. The operating frequencies selected by mode select controller 350 during control periods 520 and 525 are determined in the same manner. Although the embodiment depicted in FIG. 5 illustrates the selection of the higher operating frequency during the first portion of any given control period, in other embodiments, the distribution of the selected operating frequencies within a control period may differ. For example, in one embodiment, mode select controller 350 may select the lower operating frequency prior to the higher operating frequency within a control period. In another embodiment, mode select controller 350 may toggle back and forth between two or more operating frequencies in accordance with output 370 within a control period. In still another embodiment, mode select controller 350 may select a first frequency that is "closer to" a current frequency. It should be noted that the changes in output 370 illustrated in FIG. 5 are exaggerated for purposes of explanation. In a typical operation, output 370 may be more stable. It should further be noted that, although three active operating states are illustrated, the disclosed principles can be applied to a processor with any number of predefined active operating states. Further, in some embodiments the number of operating ranges may itself vary over time. The disclosed techniques enable the precise and substantially real time control of a processor based on the joint evaluation or behavior of the processor's power consumption and performance.

Figure 6:
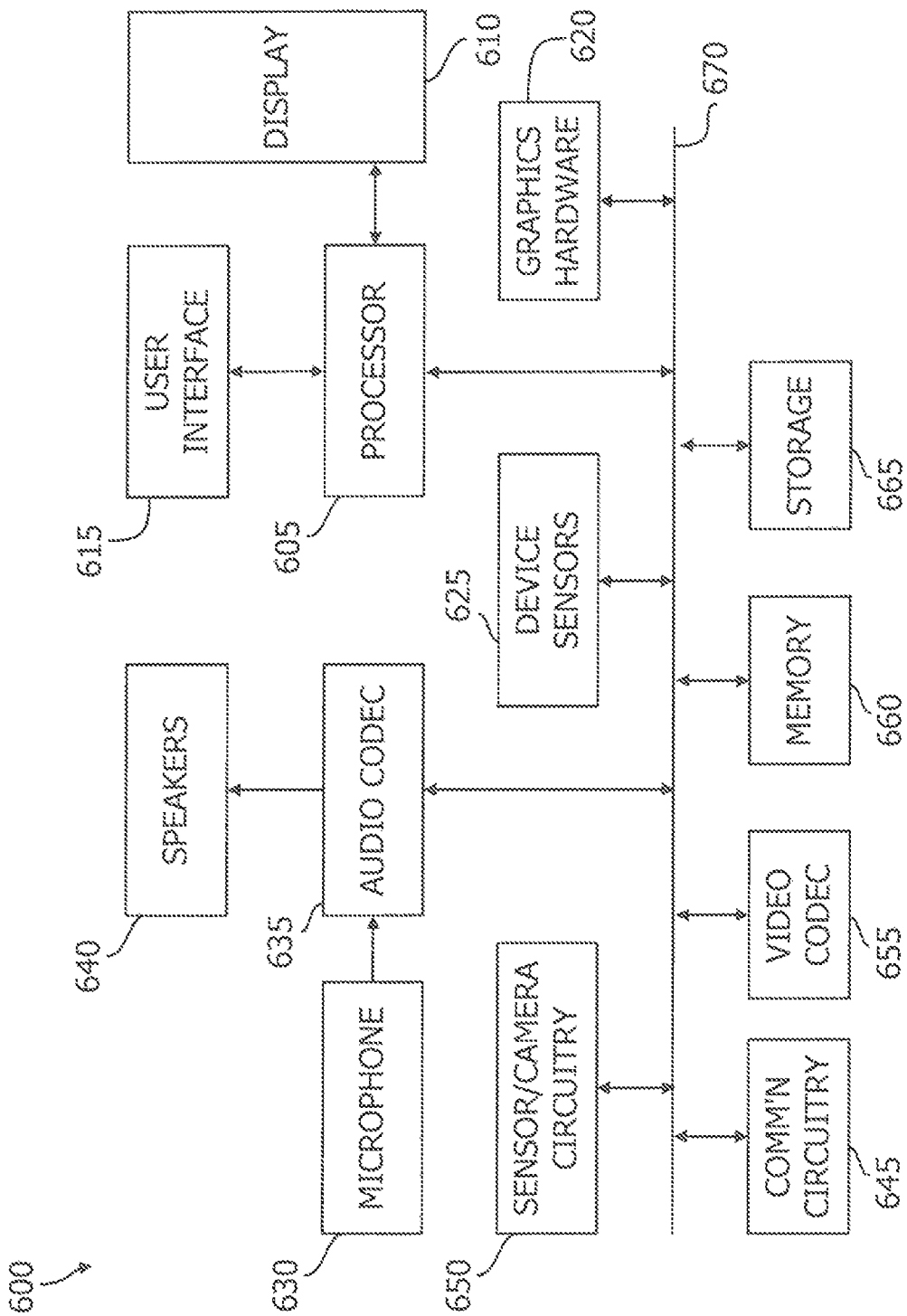
FIG. 6 is a block diagram that illustrates an electronic device in accordance with one embodiment.

Referring to FIG. 6, a simplified functional block diagram of illustrative electronic device 600 is shown according to one embodiment. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 600.

Processor 605 may execute instructions necessary to carry out or control the operation of many functions performed by device 600. Processor 605 may, for instance, drive display 610 and receive user input from user interface 615. User interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU). The disclosed control techniques may be implemented to manage the operating frequencies of processor 605 or graphics hardware 620.

Sensor and camera circuitry 650 may capture still and video images that may be processed, at least in part, in accordance with the disclosed techniques by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed, such computer program code may implement one or more of the operations described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processing unit and comprising instructions stored thereon to cause one or more processing units in a processing device to:
   compare a measured power consumption and a target power consumption of a processing device to determine a power consumption difference;
   compare a measured utilization ratio and a target utilization ratio of the processing device to determine a utilization ratio difference;
   determine a first output to reduce the power consumption difference;
   determine a second output to reduce the utilization ratio difference;
   select an output frequency for the processing device based, at least in part, on a combination of the first and second outputs; and
   adjust an operating frequency of the processing device based, at least in part, on the selected output frequency.

2. The non-transitory program storage device of claim 1, wherein the instructions to cause the one or more processing units to select an output frequency comprise instructions to cause the processing device to select the lesser of the first and second outputs.

3. The non-transitory program storage device of claim 1, wherein the instructions are executed by one or more microcontrollers that are embedded in the processing device.

4. The non-transitory program storage device of claim 1, further comprising instructions to cause the one or more processing units to determine the target power consumption based, at least in part, on a measured variable.

5. The non-transitory program storage device of claim 1, wherein the target utilization ratio comprises a static value that is specific to the processing device.

6. The non-transitory program storage device of claim 1, further comprising instructions to cause the one or more processing units to filter the selected output frequency.

7. The non-transitory program storage device of claim 6, wherein the instructions to cause the one or more processing units to filter the selected output frequency comprise instructions to cause the one or more processing units to filter the selected output frequency when the selected output frequency is decreasing and not when the selected output frequency is increasing.

8. The non-transitory program storage device of claim 1, wherein the selected output frequency comprises a combination of two or more discrete output frequencies.

9. The non-transitory program storage device of claim 8, wherein the two or more discrete output frequencies include an idle output frequency.

10. The non-transitory program storage device of claim 8, wherein the first output and the second output are proportional to a number of the discrete output frequencies.

11. The non-transitory program storage device of claim 8, wherein the instructions to cause the one or more processing units to adjust an operating frequency of the processing device comprise instructions to cause the one or more processing units to switch between two or more of the discrete output frequencies during a control period.

12. The non-transitory program storage device of claim 11, wherein the instructions to cause the one or more processing units to switch between two or more of the discrete output frequencies during a control period comprise instructions to cause the one or more processing units to determine a proportion of the control period in which to operate at each of the two or more discrete output frequencies.

13. The non-transitory program storage device of claim 12, wherein the control period is synchronous with a screen refresh rate of a display device that is driven by the one or more processing units.

14. A method, comprising:
   comparing a measured power consumption and a target power consumption of a processing device to determine a power consumption difference;
   comparing a measured utilization ratio and a target utilization ratio of the processing device to determine a utilization ratio difference;
   determining a first output to reduce the power consumption difference;
   determining a second output to reduce the utilization ratio difference;
   selecting an output based, at least in part, on a combination of the first and second outputs; and
   adjusting an operating frequency of the processing device based, at least in part, on the selected output.

15. The method of claim 14, wherein adjusting an operating frequency comprises switching between two or more operating frequencies of the processing device during a control period.

16. The method of claim 15, wherein switching between two or more operating frequencies comprises determining a proportion of the control period in which to operate at each of the two or more operating frequencies based, at least in part, on the selected output.

17. A device, comprising:
   a processing device having integrated firmware; and
   a controller that is embedded in the processing device and is configured to execute program code stored in the firmware to:
   compare a measured power consumption and a target power consumption of the processing device to determine a power consumption difference,
   compare a measured utilization ratio and a target utilization ratio of the processing device to determine a utilization ratio difference,
   determine a first output to reduce the power consumption difference,
   determine a second output to reduce the utilization ratio difference, and
   adjust an operating frequency of the device based on a combination of the first and second outputs, wherein the operating frequency comprises a combination of two or more discrete operating frequencies, wherein each of the two or more discrete operating frequencies is applied in sequence during a specified control interval.

18. The device of claim 17, further comprising a dedicated interface between the controller and the dedicated firmware.

* * * * *